Sept. 1, 1970  A. F. FINELLI  3,526,572
CONTAINER FOR LIQUID HYDROCARBONS HAVING A POLYURETHANE DERIVED
FROM AN ALIPHATIC POLYCARBONATE THE HYDROCARBON BARRIER
Filed Oct. 24, 1966

INVENTOR.
ANTHONY F. FINELLI
BY
*Henry C. Young*
ATTORNEY

United States Patent Office 3,526,572
Patented Sept. 1, 1970

3,526,572
CONTAINER FOR LIQUID HYDROCARBONS HAVING A POLYURETHANE DERIVED FROM AN ALIPHATIC POLYCARBONATE THE HYDROCARBON BARRIER
Anthony F. Finelli, Akron, Ohio, assignor to The Goodyear Tire & Rubber Company, Akron, Ohio, a corporation of Ohio
Filed Oct. 24, 1966, Ser. No. 588,886
Int. Cl. B32b 27/36, 27/40
U.S. Cl. 161—183                    7 Claims

ABSTRACT OF THE DISCLOSURE

A container for liquid hydrocarbons having a wall of cured diisocyanate reacted with linear acrylic hydroxyl terminated polycarbonate adhered to cured polyurethane, natural or synthetic rubber or plasticized vinyl resins.

---

Figure 1:
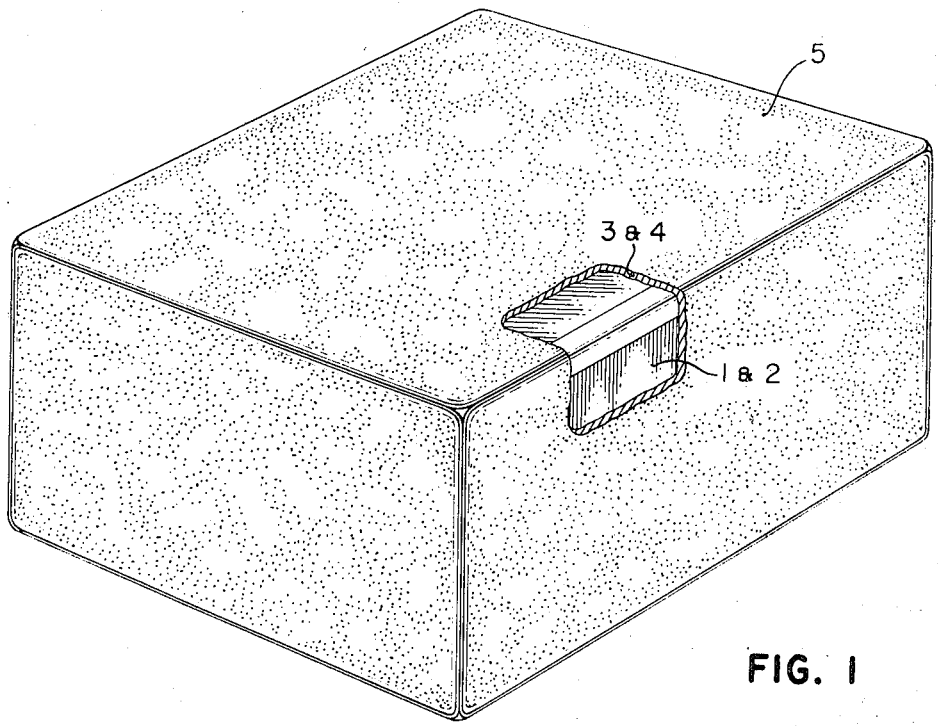

This invention relates to a structure having improved resistance to the diffusion of hydrocarbons and hydrocarbon vapors. More particularly, this invention relates to a method of preparing a structure having a hydrocarbon barrier and to the structure.

Various polymeric materials can be used as structures to contain hydrocarbons. Such structures are usually in the form of containers and pipes as well as liners for various containers and pipes.

Polyurethanes are particularly useful structural materials for preparing containers for hydrocarbons since the various structures can be prepared from liquid polyurethane reaction mixtures by dipping, brushing or spraying the liquid polyurethane reaction mixture onto a form and allowing the said reaction mixture to cure to a solid polyurethane without the usual time consuming steps of fabricating and molding required for other plastics and elastomers. Thus, polyurethanes are uniquely highly versatile in preparing structures for containing hydrocarbons. However, a serious disadvantage has been found when polyurethanes have been used to contain certain hydrocarbons, and various mixtures which include hydrocarbons, in that many hydrocarbons and their vapors tend to diffuse through the polyurethane causing a loss of hydrocarbon from the container and, thus, causing hydrocarbon vapors to be present adjacent to the container, thereby creating a dangerous fire and explosive hazard.

The application of an effective hydrocarbon barrier to a polyurethane structure to prevent the diffusion of hydrocarbons through the polyurethane would greatly enhance its use as a structural material for liquid hydrocarbon containers. Generally, hydrocarbon barrier materials applied to the surface of polyurethanes are applied as alcohol solutions. The alcohols can interfer with the cure of the polyurethane layer and can cause cracks in the polyurethane inner liner.

Typically, nylon coatings have been used as liquid hydrocarbon barriers for polyurethane containers for liquid hydrocarbons, although they are deficient in several respects. Nylon is usually applied to the polyurethane as an alcohol or alcohol and water solution. Both alcohol and water can interfere with the curing of the polyurethane and can degrade the polyurethane. Generally, the nylon coat is adhered to the polyurethane only with difficulty. Furthermore, many hydrocarbons contain small amounts of water which will tend to cause a failure of the adhesion of the nylon coat to the polyurethane.

It is an object of this invention to provide a composite structure for containing liquid hydrocarbons comprising a polymeric material having a liquid hydrocarbon barrier comprising a polyisocyanate-modified polycarbonate and to provide a method of preparing such a composite structure. It is a further object of this invention to provide a polyurethane container for liquid hydrocarbons having an improved resistance to the diffusion of the said liquid hydrocarbons.

According to this invention, it has been found unexpectedly that a container for liquid hydrocarbons having improved resistance to the diffusion of the said liquid hydrocarbons comprises at least one wall of a cured diisocyanate-modified polycarbonate, the said cured diisocyanate-modified polycarbonate comprising the product of a reaction mixture prepared by reacting at least one compound selected from the group consisting of glycols and diamines with the reaction product of a linear hydroxyl terminated polycarbonate and an aromatic diisocyanate.

Figure 2:
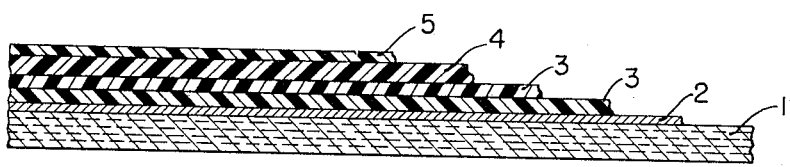

The advantages and objects of this invention may be more readily understood by reference to the drawings wherein FIG. 1 is a perspective view of a fuel tank and FIG. 2 is a partial fragmented view of a wall of the tank.

Reference to the figures shows a building form 1 which can be various materials such as metal, a plastic, wood, paper, or cardboard in the general shape of the tank to be prepared. It is usually desired that the surface of the building form will not adhere to the polyurethane coat to be applied to it when the polyurethane coat is cured. Usually the building form coated with a releasing agent 2, such as wax or other well-known materials and then at least one spray coat of a polyurethane reaction mixture 3 is applied over the releasing agent. The polyurethane coats are built up to a desired thickness, and usually allowed to dry and at least partially cure until they are tack free. To the polyurethane coat is applied a coating 4 of the liquid hydrocarbon barrier reaction mixture. The hydrocarbon barrier coat is usually allowed to dry and partially cure at least until it is tack free. Then it is usually desired to apply at least one spray coat of a polyurethane reaction mixture 5 to the barrier coat. It is to be appreciated that a fabric covering can be applied to the building form, to the polyurethane coats or to the barrier material to add strength to the polyurethane structure. It is also to be understood that the barrier material coat can be applied to the building form or to any of the polyurethane coats. It should be apparent that additional spray coats of a polyurethane reaction mixture can be applied to increase the thickness of the container wall. The various coats of polyurethane can be dried and cured within a relatively short time, with the application of heat if desired, usually within about an hour or less depending upon the nature of the polyurethane reaction mixture and the catalyst utilized. Then the building form is removed from the prepared hydrocarbon container.

Thus, according to this invention a container for liquid hydrocarbons comprises at least one wall comprising a layer of a polymeric material and hydrocarbon barrier layer adhered to the said polymeric material layer, the said hydrocarbon barrier layer comprising the product of a reaction mixture prepared by reacting at least one compound selected from the group consisting of glycols and diamines with the reaction product of a linear hydroxyl terminated polycarbonate and an organic diisocyanate.

In the practice of this invention, a container for liquid hydrocarbons having a barrier for liquid hydrocarbons is prepared by coating at least one wall of a container, the said wall consisting essentially of a polymeric material, with a liquid reaction mixture, the said liquid reaction mixture being prepared by mixing at least one compound selected from the group consisting of glycols and diamines with the reaction product of a linear hydroxyl terminated polycarbonate and an organic diisocyanate, and curing the said reaction mixture coat.

Thus, a container for liquid hydrocarbons can be prepared according to this invention by spray-coating at least one coat of a liquid polyurethane reaction mixture onto a building form, which form does not adhere to the polyurethane reaction mixture when the said polyurethane reaction mixture is cured, applying at least one coat of a hydrocarbon barrier liquid reaction mixture to the polyurethane coat, the said hydrocarbon barrier reaction mixture being prepared by mixing at least one compound selected from the group consisting of glycols and diamines with the reaction product of a linear hydroxyl terminated polybonate and an organic diisocyanate, and curing the said polyurethane reaction mixture and the said hydrocarbon barrier reaction mixture coats. If desired, a coat of liquid polyurethane reaction mixture can be applied over the coat of the said hydrocarbon barrier. Also, in the practice of this invention, the hydrocarbon barrier layer can be at least partially cured and laminated to a polymeric material to form a laminate.

The hydrocarbon barrier of this invention is prepared by reacting at least one diamine or glycol or their mixture with the reaction product of a mixture of at least one linear hydroxyl terminated polycarbonate and at least one organic diisocyanate. It is usually desired that the ratio of isocyanate groups of the organic diisocyanate to the reactive hydrogen groups of the polycarbonate is from about 1.1/1 to about 12/1 and preferably from about 1.2/1 to about 2.5/1. The diisocyanate and the polycarbonate are usually reacted at temperatures of from about 20° C. to about 150° C. The reactive hydrogens are supplied by the hydroxyl groups. The polymeric reaction product of the diisocyanate and the polycarbonate is usually dissolved or dispersed in a solvent. If a solvent is used, usually sufficient solvent is added to form a solution having from about 40 to about 65 percent solids although higher or lower concentrations of solids can be used depending upon the intended application. The diamine or glycol is then added to the solution or dispersion to form a liquid reaction mixture. The addition of the diamine or glycol is usually made immediately before the application of the reaction mixture. The diamine or glycol reacts to cure the diisocyanate-modified polycarbonate. Generally the diamine or glycol is reacted with the diisocyanate-modified polycarbonate at a temperature of from about 20° C. to about 200° C. although higher or lower temperatures can be used. The diamine or glycol is usually added to the diisocyanate-modified polycarbonate in a ratio of from about 0.5/1 to about 1.5/1 and preferably from about 0.8/1 to about 1.0/1 of the amine groups or hydroxyl groups for each isocyanate group in excess of the reactive hydrogen groups of the polycarbonate.

Various diamines and glycols can be used to cure the diisocyanate-modified polycarbonate. Representative diamines are diamines such as o-dianisidine, 4,4'-diamino diphenylmethane, o - dichlorobenzidine, 4,4' - diamino - diphenylsulfone and 4,4'-methylene bis (2-chloroaniline). Various glycols can be used such as ethylene glycol, 1,3-propane diol, 1,4-butane diol and glycerol.

Various linear hydroxyl terminated polycarbonates can be used to prepare the hydrocarbon barrier of this invention. Preferably the said polycarbonates have molecular weights of from about 800 to about 5000 and usually from about 1600 to about 3000, hydroxyl numbers of from about 20 to about 140 and contain terminal hydroxyl groups to the essential exclusion of other terminal groups. Representative of the polycarbonates are those having the following general structure:

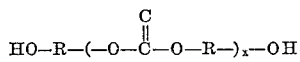

wherein R represents a residue of a saturated acyclic (aliphatic) diol and X represents the number of repeating units of the molecule depending upon the particular diol from which R is derived. X may vary but usually is a whole integer from about 5 to about 50. For example, if diethylene glycol is the source of R, X is usually from 12 to 20.

These hydroxyl terminated polycarbonates can be prepared by the reaction of a suitable glycol with the bis chloroformate of the desired glycol. Methods which can be used for their preparation are described hereinafter in Procedures A and B.

Also, mixed polycarbonates prepared from two or more acyclic saturated diols can be used to prepare the hydroxyl terminated polycarbonates.

Useful linear hydroxyl terminated polycarbonates for preparing the hydrocarbon barrier of this invention can be prepared by the following illustrative procedures:

PROCEDURE A

Into a suitable reactor, a mixture including an inert organic solvent such as ethylene dichloride, a bis-chloroformate of a diol, e.g. diethylene glycol, and a diol such as diethylene glycol are charged. Between 1.0 and 2.0 mols of bis-chloroformate per mol of glycol are employed. With temperatures of between 0° C. and 30° C., an aqueous solution of concentrated sodium hydroxide (e.g. 50 percent NaOH) is injected into the mixture, until a total of about 3 to 5 moles of NaOH per mol of bis-chloroformate is added. Good agitation of the mixture accompanies the addition and is continued from about 2 to 3 hours thereafter.

The resulting mixture is phase separated and the organic layer, if necessary may be filtered whereafter the inert solvent is removed by vacuum distillation at temperatures below about 125° C. The hydroxyl terminated polycarbonate remains as the bottom.

PROCEDURE B

Using a mixture of between about 1.05 and 1.15 mols of an acyclic diol such as diethylene glycol per mol of a carbonate diester, e.g. diethyl carbonate, an ester interchange or alcoholysis type of reaction is conducted to provide a linear polycarbonate. A catalyst, for example, metallic sodium in concentrations on the order of 0.005 percent by weight of the mixture, is used.

The reaction is effected by applying heat, usually to gradually elevate the temperature up to as high as about 200° C. Throughout the reaction, the evolved ethyl alcohol is withdrawn from the system by gradual application of a vacuum thereto as the reaction progresses. The mol ratio of reactants is maintained essentially constant throughout by returning any reactants which may accompany the removed ethyl alcohol by selective condensation.

After concluding the reaction, the product containing reaction mixture is subjected to vacuum topping to remove unreacted reagents. Maximum temperatures of between about 150° C. and 200° C. are used in this step.

Various aromatic diisocyanates can be used to prepare the hydrocarbon barrier of this invention. Representative of the various aromatic diisocyanates are those in which the diisocyanates are nuclear substituents such as para phenylene diisocyanate, 1,5-naphthylene diisocyanate, tolidine diisocyanate, 3,3' - dimethyl, 4,4' - diphenyl diisocyanate, 3,3' - dimethoxy, 4,4' - diphenylene diisocyanate, 2,4-toluene diisocyanate, and 2,6-toluene diisocyanate and their mixtures. Also, corresponding diisocyanates in which the aromatic nucleus is further substituted with halogens, namely, chlorine such as 2-chloro para phenylene diisocyanate and particularly those substituted with more alkyl groups containing usually up to 5 carbon atoms such as methyl, ethyl, isopropyl, butyl, and amyl nuclear substituents. Inert nuclear substituents such as NO₂ may also be present.

The hydrocarbon barrier of this invention can be applied to various polymeric materials. Although it is usually desired to apply the hydrocarbon barrier as a reaction mixture onto the surface of a polymeric material and then to cure the liquid reaction mixture, the hydrocarbon barrier reaction mixture can be cured and then applied to a polymeric material as a laminate. It is to be understood that hydrocarbon barrier liquid reaction mixture can be applied to the various polymeric materials by conventional techniques known to those skilled in the coating and laminating art such as by spraying, pouring, brushing and dipping. Application by spraying is usually preferred. It is to be further understood that the hydrocarbon barrier of this invention can be used as either an inner liner for a container, particularly where it is desired to prevent the liquid hydrocarbon from contacting the polymeric material used for the structure of the container or it can be used as a coating or laminate for other surfaces of the polymeric container material. Although polyurethanes are the preferred polymeric materials to which the hydrocarbon barrier of this invention can be applied, other polymeric materials may be used as well. Suitable polymeric materials which can be used for the polymeric structures in this invention are materials such as elastomers and plastics such as rubbery polymers and copolymers and plasticized vinyl resins. Representative examples of the polymeric materials are natural rubber and the various synthetic rubbers such as rubbery polymers of conjugated dienes including polychloroprene, the rubbery copolymers of butadiene and styrene which contain a major proportion of butadiene, particularly copolymers of butadiene and styrene of the hot and cold SBR type which contain from 70 to 80 percent by weight of butadiene, copolymers of butadiene and acrylonitrile, butyl rubber, which is a polymerization product of a major proportion of a monoolefin, such as butylene, and a minor portion of multi-olefin, such as butadiene and isoprene, copolymers of ethylene and propylene, terpolymers of ethylene, propylene and a minor proportion of a diene, polyisoprene, polybutadiene, and polymers of alpha olefins such as polyethylene, polypropylene, polybutylene, polyamylene and polyhexylene.

Representative plasticized vinyl resins are plasticzed polyvinyl chloride and plasticized copolymers of vinyl chloride with another vinyl compound such as vinyl chloride-vinyl acetate copolymers, vinyl chloride-vinyl ether copolymers, vinyl chloride-maleate or fumarate copolymers and vinyl chloride-vinylidene chloride copolymers. It is to be understood that the hydrocarbon barrier of this invention is usually used as an inner liner where the container structure is a plasticied vinyl resin prepared from a plasticizer which is not hydrocarbon resistant.

When the hydrocarbon barrier is applied to polymeric materials other than polyurethanes, usually it is desired to apply to the said polymeric materials an adhesive or cement to assist in adhering the hydrocarbon barrier to the polymeric material, although adhesives of cements can be used where the polymeric material is a polyurethane.

The use of an adhesive or cement results in various degrees of adhesive or bonding strengths depending upon the polymeric material used. When bonding cements are used, they are selected for a particular application so that good adhesion is obtained. Thus, for example, cold rubbery butadiene-styrene compositions are suitably bonded by a cement bonded by a cement comprising about 150 parts of an epoxy resin, such as Epon 820 sold by the Shell Oil Company, about 50 parts cyclohexanone and about 400 parts of methyl ethyl ketone. Various other epoxy resins can also be used. For examples of some epoxy resins such as polyepoxides, see U.S. Pat. 2,886,473. A cement which gives good results with compositions of natural rubber and the stereo specific synthetic rubbers, such as cis-polyisoprene and cis-polybutadiene, is a 10 percent by weight dispersion of polychloroprene in a solvent comprising a mixture of about 60 percent by weight of toluene and about 40 percent by weight of methyl ethyl ketone, each one hundred parts of polychloroprene having been compounded with about 4 to 5 parts of magnesium oxide, two parts of an amine-type antioxidant, such as phenyl beta naphthylamine, 8 to 10 parts of rosin oil, and a suitable accelerator such as carboaniline or a thioamine accelerator. If desired, up to 30 parts of a carbon black, such as channel black, per hundred parts by weight of polychloroprene can also be used. Other cements, such as those normally used in recapping tires can be used and are particularly effective when from about 5 to 20 percent by weight of a polyisocyanate has bee nadded to the cement. A preferred polyisocyanate for this purpose is a mixed polyisocyanate obtained by phosgenation of an aldehyde-aromatic amine reaction product, a particularly effective one being a polymethane, polyphenylene polyisocyanate.

When the hydrocarbon barrier reaction mixture is to be applied to various polyurethane structures, various polyurethane reaction mixtures can be used to prepare such polyurethane structures. Such polyurethane reaction mixtures generally comprise a reactive hydrogen-containing polymeric material and an organic polyisocyanate. Usually a solvent is added to the reaction mixture so that it will be in the form of a fluid mixture or solution. Generally, sufficient solvent is added to form a solution containing from about 40 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 55 percent or higher is generally desired.

The reactive hydrogen-containing polymeric material used to prepare the polyurethane structure comprises at least one member selected from the group consisting of polyester polyols, polyesteramides, polyether polyols, dihydroxy-terminated polymers of conjugated diene hydrocarbons, and caster oil. The reactive hydrogen-containing material generally used has a molecular weight between about 700 and about 5000 and, usually between about 1000 and about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethane structure can be prepared by polymerizing or copolymerizing alkylene oxides such as ethylene oxide, propylene oxide, and butylene oxides, by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of dihydroxy-terminated polymers of diene hydrocarbons are dihydroxy-terminated polymers of dienes such as isoprene and butadiene or dihydroxy-terminatde copolymer of a diene and an alpha olefin of two to 20 carbon atoms.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, o-tolidine, dichlorobenzidine and methylene-bis-o-chloroaniline.

The organic polyisocyanates used to prepare the polyurethane structures to which the hydrocarbon barrier can be applied include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4' - tetramethylene diisocyanate, 1,6-hexamethylene diisocyanate, 1,10-decamethylene diisocyanate, 1,4-cyclohexylene diisocyanate, 4,4' - methylene-bis (cyclohexylisocyanate) and 1,5 - tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-biphenylene diisocyanate, are preferred. For convenience, these diisocyanates are referred to as TDI, MDI and TODI, respectively.

The polyurethane polymers to which the hydrocarbon barrier can be applied are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups. This prepolymer, itself a polyurethane, is then usually dissolved or dispersed in the solvent to form a solution or dispersion which is then reacted with a catalyst, chain extending agent, and/or a crosslinking agent to form a polyurethane reaction mixture.

Other methods known to those skilled in the art of preparing polyurethane reaction mixtures with or without solvents being present may also be used.

In preparing the polyurethane structure, a catalyst can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids.

Also, in preparing the polyurethane structure, agents which promote chain extension and crosslinking of the polymer are also useful and are sometimes known as curing agents. Aromatic diamines, hydrocarbon diols such as ethylene glycol and propylene glycol, hydroxylamines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general, the bifunctional materials yield products having superior spraying properties. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols such as ethylene glycol, 1,3-propanediol, 1,4-butanediol and glycerol; aliphatic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4' - diamino-diphenyl methane, dianisidine, 4,4' - diamino-diphenyl methane, the naphthalene diamines, tolylene-2,4-diamine, p-aminobenzyl amine, and o- and p-aminodiphenylamine; hydroxy amines such as triethanol amine, 2-amino-ethyl alcohol, hydroxy carboxylic acids such as glycolic acid and alphahydroxy propionic acid; and amino carboxylic acids such as amino acetic acid and amino benzoic acid. The preferred crosslinking agents are butane diol and the chloroamines such as ortho-dichlorobenzidine and methylene bis orthochloroaniline. The latter two chloroamines above are sometimes referred to herein for convenience as ODCB and MOCA, respectively. Generally, the chain extending or crosslinking agents having acid groups tend to form a cellular polyurethane and thus, form a hydrocarbon container having buoyancy.

In the preparation of the polyurethane for the polyurethane structure to which the hydrocarbon barrier can be applied, a method for selecting the diisocyanates and diamines which form sprayable liquid reaction mixtures that can be mixed and used with a single container-type spray gun is the boiling methylene chloride turbidity test. By this method 0.2 to 0.5 molar solutions of the diisocyanate and diamine are made with methylene chloride. Equal molar amounts of the respective methylene chloride solutions of diisocyanate and diamine are raised to the boiling temperature and mixed. If a turbidity develops inside of 15 to 30 seconds, this combination of diisocyanate and diamine will not yield a reaction mixture which can be sprayed under normal conditions because of the high reaction rate. However, this combination can be sprayed successfully at a lower temperature or by using a spray gun having a mixing head. On the other hand, those mixtures of diisocyanate and diamine which do not produce a turbidity within about 15 to 30 seconds can be sprayed under normal spray conditions familiar to those skilled in the art.

Some combinations of polyisocyanates and crosslinking agents especially well suited for use are:

TDI—MOCA
TDI—ODCB
TDI—APS [1]
TODI—MOCA
TODI—ODCB
TODI—APS
MDI—MOCA
MDI—ODCB
Naphthalene diisocyanate—MOCA
Naphthalene diisocyanate—ODCB
Naphthalene diisocyanate—APS
4,4'-diphenyl diisocyanate—MOCA
4,4'-diphenyl diisocyanate—ODCB
4,4'-diphenyl diisocyanate—APS

[1] APS is bis(3,3'-amino phenyl) sulfone.

Any of the non-reactive solvents normally used in making paints which are suitable for spraying are useful in this invention for the hydrocarbon barrier reaction mixture and for the polyurethane structure. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, cellosolve acetate, Cellosolve propylate, dioxane, lower nitroparaffins, etc.

Mixtures of solvents may be used to obtain satisfactory spreading properties and evaporation rates when the polyurethane spray composition is applied to a polymeric surface.

If desired, pigments, surface-active agents, leveling agents, such as cellulose acetate butyrate, and other additives well-known to the spray-coating art can be added to the solution or dispersion of the reaction mixture. When a pigment is added, it is added in an amount from about 0.5 to 10 parts and, preferably, in the amount from about one to two parts of pigment per hundred parts of prepolymer by weight.

Submicroscopic pyrogenic silica has been found to be an effective leveling agent. This material is prepared by the vapor phase hydrolysis of silicon tetrachloride. Such silica, sold under the trademark Cab-o-sil by Godfrey L. Cabot, Inc., is useful as a leveling agent in the sprayable compositions when used in about 0.1 to 10 parts by weight per 100 parts of the prepolymer in the solution. The preferred amount is from about 0.5 to about 4 parts by weight. This range of pyrogenic silica gives improved thixotropic properties to the resulting sprayable composition.

The various polyurethanes to which the hydrocarbon barrier material may be applied are usually prepared by the prepolymer method which comprises reacting the curing agent with the polymer formed by the reaction of a polyisocyanate with the reactive hydrogen containing material. The following prepolymers are suitable for preparing such polyurethanes:

Prepolymer A

A reaction product of 2 mols of tolylene diisocyanate with about 1 mol of a polyester having a molecular weight of from about 1000 to about 2000 formed by condensing an excess of ethylene glycol with adipic acid.

Prepolymer B

Same as Prepolymer A except that about 1.1 mols of the diisocyanate are reacted with the polyester.

Prepolymer C

Same as Prepolymer A except propylene glycol was used to produce the polyester instead of ethylene glycol.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a polytetramethyleneether glycol having a molecular weight of from about 800 to about 3000.

Prepolymer G

The reaction product of 2 mols of toluene diisocyanate with 1 mol of a polyester having a molecular weight of from about 1000 to about 1500 prepared by the condensation of adipic acid with an excess of a mixture consisting of 80 percent by weight ethylene glycol and 20 percent by weight propylene glycol.

EXAMPLE 1

A diisocyanate-modified polycarbonate was prepared by reacting a liquid polycarbonate ester having a molecular weight of about 1900 and a reactive number of about 58 and prepared by the reaction of diethylene glycol and phosgene, with a mixture comprising 2,4-tolylene diisocyanate and 2,6-tolylene diisocyanate in a mol ratio of 80/20 of 2,4-tolylene diisocyanate to 2,6-tolylene diisocyanate in the following manner: (The term reactive number means the total acid and hydroxyl numbers of the polycarbonate ester.)

To a suitable reactor were added 500 parts of the liquid polycarbonate ester. To the polycarbonate ester were added 0.2 parts of magnesium oxide. The mixture was degassed at a reduced pressure of about 10–20 millimeters of mercury at 93° C. for 50 minutes. Then 91 parts of the mixture of tolylene diisocyanates were added to the mixture and the mixture was stirred at 83° C.–100° C. for 50 minutes at atmospheric pressure. A reduced pressure of about 20 millimeters of mercury was then applied to the mixture for 15 minutes.

To this polymeric diisocyanate-modified polycarbonate at 90° C. was added 18 parts of a molten 4,4'-methylene bis(2-chloraniline). The mixture was stirred and poured into a 12" x 12" x 0.05" mold. The mixture was heated to 93° C. for 24 hours to produce a cured diisocyanate-modified polycarbonate suitable for a hydrocarbon barrier having a thickness of about 0.05 inch. The prepared cured diisocyanate-modified polycarbonate had the following properties:

Shore A hardness _____ 90
Tensile strength at an ultimate elongation of 480
  percent in pounds per square inch _____ 3000
Specific gravity _____ 1.34
Volume change (percent) after soaking for 96
  hours at 25° C. in a mixture comprising 70 parts
  of isooctane and 30 parts of toluene _____ 1.0

A hydrocarbon diffusion test of the prepared cured diisocyanate-modified polycarbonate was made by the following method:

A cylindrical metal cup was used in performing the diffusion test which had an inside height of 2.47 inches and an inside diameter of 2.00 inches. Into the cup was placed 100 cubic centimeters of a mixture comprising 70 parts by weight of isooctane and 30 parts by weight of toluene. A test sample of the prepared cured diisocyanate-modified polycarbonate was placed over the open end of the cylindrical cup. The cup was then inverted with the test sample now begin on the bottom of the cylinder. The cup and test sample were maintained at 77° F. in an atmosphere having a relative humidity of 40%. The cup and sample were weighed at the start of the test and at intervals of time of 72 hours and 144 hours. Diffusion of the hydrocarbon mixture through the test sample is expressed in fluid ounces per square foot per 24 hours. It is equal to the gram loss of the test sample per 24 hours multiplied by a Factor K. The Factor K is defined as follows:

$$K = \frac{144}{(sp\ gr)(29.573)(3.142)R^2}$$

where:

$sp\ gr$ = specific gravity of test fluid at 77° F.
$R$ = inside radius of test cup expressed in inches Diffusion of the hydrocarbon mixture through the test sample of the cured diisocyanate-modified polycarbonate was zero fluid ounces per square foot per 24 hours.

EXAMPLE 2

A diisocyanate-modified polycarbonate was prepared according to the method of Example 1. It was then diluted by mixing with 100 parts of the diisocyanate-modified polycarbonate 30 parts of methyl ethyl ketone, 30 parts of cellosolve acetate, and 5 parts of a mixture comprising 90 parts of cellosolve acetate and 10 parts of cellulose acetate butyrate. The total mixture was stirred and filtered to remove any particulate material.

To 50 parts of the total mixture was added 7.5 parts of a solution comprising 2.5 parts of impure 4,4'-methylenedianiline, obtained as Commercial Tonox from the United States Rubber Company, and 5 parts of methyl ethyl ketone.

The resulting mixture was poured onto a polyethylene surface and allowed to dry and cure at about 25° C. for about 24 hours to form a cured diisocyanate-modified polycarbonate film of about 0.009 inch thickness and having the following properties:

Tensile strength at an ultimate elongation of 300
  percent in pounds per square inch _____ 1300
Percent volume change after soaking for 96 hours at
  25° C. in a solution comprising 70 percent by
  weight isooctane and 30 percent by weight
  toluene _____ 0.61

EXAMPLE 3

A diisocyanate-modified polycarbonate was prepared according to the method of Example 1 and diluted by dissolving 100 parts of the diisocyanate-modified polycarbonate in a mixture comprising 40 parts of toluene and 20 parts of methyl ethyl ketone. To this solution was added 8.14 parts of a mixture comprising 2.14 parts of 4,4'-methylene bis (2 chloroaniline) and 6 parts of methyl ethyl ketone. The mixture was poured onto a polyethylene surface and allowed to dry and cure at 25° C. for 24 hours to form a cured diisocyanate-modified polycarbonate film having a thickness of about .015 inch.

A diffusion test was conducted on the prepared film according to the method of Example 2. Diffusion of the hydrocarbon mixture through the test sample of cured diisocyanate-modified polycarbonate was 0.004 fluid ounces per square foot per 24 hours.

EXAMPLE 4

A diisocyanate-modified polycarbonate was prepared according to the method of Example 1 and was diluted by dissolving 100 parts of the modified polycarbonate in a mixture comprising 40 parts of toluene and 20 parts of methyl ethyl ketone. To this solution was added 8.6 parts of 4,4'-methylene bis (2-chloroaniline), 10 parts of methyl ketone, and 0.5 parts of 2-mercaptobenzothiazole. The resulting mixture was sprayed onto a polyethylene surface and allowed to dry and cure at about 25° C. for about 24 hours to form a cured diisocyanate-modified polycarbonate film.

A diffusion was conducted on a test sample of the film according to the method of Example 1. Diffusion of the hydrocarbon mixture through the test sample was zero fluid ounces per square foot per 24 hours.

EXAMPLE 5

A diisocyanate-modified polycarbonate was prepared according to the method of Example 1 and 50 parts of the modified polycarbonate was diluted with a mixture comprising 20 parts of toluene, 10 parts of methyl ethyl ketone and 2 parts of Cab-o-sil (a microscopic pyrogenic silica prepared by the vapor phase hydrolysis of silicon tetrachloride from the Godfrey L. Cabot, Inc., Co.). To this mixture was added 4.3 parts of 4,4'-methylene bis (2-chloroaniline), and 10 parts of methyl ethyl ketone. The resulting mixture was sprayed onto a polyethylene surface and allowed to dry and cure at about 25° C. for about 24 hours to form a cured diisocyanate-modified polycarbonate film. A diffusion test was conducted on a test sample of the film according to the method of Example 1. Diffusion of the hydrocarbon mixture through the test sample was 0.004 fluid ounces per square foot per 24 hours.

EXAMPLE 6

A laminate suitable for at least one wall of a container for liquid hydrocarbons was prepared by coating a layer of polyurethane with a diisocyanate-modified polycarbonate. The laminate had a substantially improved resistance to the diffusion of the liquid hydrocarbons as compared to a layer of the polyurethane without the coat of diisocyanate-modified polycarbonate.

The polyurethane layer of the laminate was prepared by the following method:

First, a polurethane prepolymer was prepared by re-acting a mixture of polyesters, the polyesters compris-ing two mols of a condensation product having a molecular weight of about 2000 and a reactive number of about 60 of adipic acid and a mixture of ethylene and propylene glycols wherein the mol ratio was 80/20 ethylene glycol to propylene glycol and one mol of a condensation product having a molecular weight of about 2000 and a reactive number of about 58 of adipic acid and tetramethylene glycol, with 6 mols of a mixture of 80 percent 2,4-tolylene diisocyanate and 20 percent of 2,6-tolylene diisocyanate. The resulting polyurethane prepolymer was diluted to form a polyurethane prepolymer solution in the following manner. To 100 parts of the prepolymer was added 30 parts of toluene, 30 parts of methyl ethyl ketone, and 5 parts of a solution comprising 90 percent cellosolve acetate and 10 percent cellulose acetate butyrate.

A curative solution for the polyurethane prepolymer was then prepared by mixing 180 parts of 4,4'-methylene bis(2-chloroaniline) with 190 parts of methyl ethyl ketone and 25 parts of 2-mercaptobenzothiazole.

To 100 parts of the polyurethane prepolymer solution was added 12 parts of the prepared curative solution. The resulting mixture was poured onto a flat polyethylene surface and then allowed to cure for about 24 hours at about 25° C.

A hydrocarbon barrier reactive mixture was prepared acording to the following method:

A diisocyanate-modified polycarbonate was prepared by reacting 100 parts of a liquid polycarbonate ester having a molecular weight of about 1900 and a reactive number of about 60, prepared by the reaction of diethylene glycol and phosgene, with 187 parts of a mixture comprising 2,4-tolylene diisocyanate and 2-6 tolylene diisocyanate in a mole ratio of 80/20 of 2,4-tolylene diisocyanate to 2,6-tolylene diisocyanate. A solution of the diisocyanate-modified polycarbonate was prepared by mixing 100 parts of the diisocyanate-modified polycarbonate with 30 parts of methyl ethyl ketone and 30 parts of toluene.

To 64 parts of this prepared solution was added 15.9 parts of a curative solution. The curative solution was prepared by mixing 3.0 parts of o-dianisidine, 0.5 parts of tallow 1,3- propylene diamine dioleate, 0.4 parts of 2-mercaptobenzothiazole, and 12 parts of methyl ethyl ketone. The resulting mixture was coated onto the earlier prepared polyurethane layer and allowed to cure for about 25 hours at about 25° C. to form a laminate comprising a layer of polyurethane and a layer of the cured diisocyanate-modified polycarbonate. A diffusion test was conducted on the laminate according to the method of Example 2. Diffusion of the hydrocarbon mixture through the laminate test sample was zero fluid ounces per square foot per 24 hours.

EXAMPLE 7

A laminate was prepared according to the method of Example 6 wherein the cured diisocyanate-modified polycarbonate was prepared by mixing 64 parts of the diisocyanate-modified polycarbonate solution with 14.4 parts of a curative solution prepared by mixing 3.4 parts of 4,4-methylene bis (2-chloroaniline), 0.5 parts of tallow, 1,3-propylene diamine dioleate, 0.5 parts of 2-mercaptobenzothiazole, and 10 parts of methyl ethyl ketone. This mixture was coated onto the cured polyurethane layer and allowed to cure for about 24 hours at about 25° C.

The prepared laminate had the following properties:

Tensile strength at an ultimate elongation of about
  600 percent in pounds per square inch _____ 3200
Thickness (inches) _____ 0.03
Volume change (percent) after soaking for 96 hours
  at 25° C. in a mixture comprising 70 parts of iso-
  octane and 30 parts of toluene _____ 8.0

While certain representative embodiments and details have been shown for the purpose of illustrating the invention, it will be apparent to those skilled in this art that various changes and modifications may be made

What is claimed is:

1. A container for liquid hydrocarbons comprising at least one wall of a cured aromatic diisocyanate-modified linear hydroxyl terminated polycarbonate adhered to a layer of polymeric material, the said polymeric material being selected from the group consisting of cured polyurethanes, natural rubber, synthetic rubbers and plasticized vinyl resins, and where the said modified linear polycarbonate is the reaction product of a reaction mixture prepared by reacting a curative selected from glycols and aromatic diamines with the reaction product of an aromatic diisocyanate and a linear hydroxyl terminated polycarbonate having a molecular weight of from about 800 to about 5000, a hydroxyl number of from about 20 to about 140 and having the general structure:

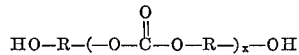

where R is a residue of a saturated acyclic diol and X represents the number of repeating units of the molecule of from about 5 to about 50, wherein the ratio of isocyanate groups of the aromatic diisocyanate to the hydroxyl groups of the polycarbonate is from about 1.1/1 to about 12/1 and the ratio of the amine groups of the diamine to the isocyanate groups in excess of the hydroxyl groups of the polycarbonate is from about 0.5/1 to about 1.5/1.

2. The container according to claim 1 wherein the diisocyanate-modified polycarbonate is adhered to a cured polyurethane.

3. The container according to claim 2 wherein the cured polyurethane is the reaction product of a reaction mixture prepared by reacting at least one curative compound selected from the group consisting of aromatic diamines, hydrocarbon diols, and hydroxylamines, with the reaction product of an organic polyisocyanate and at least one reactive hydrogen-containing compound having a molecular weight of from about 700 and about 5000 and selected from the group consisting of polyester polyols, polyester amides, polyether amides, dihydroxy-terminated polymers of conjugated diene hydrocarbons, and castor oil, wherein the ratio of the isocyanate groups of the polyisocyanate to the reactive hydrogens of the reactive hydrogen-containing compound is from about 1.1/1 to about 12/1 and the ratio of the total amine and hydroxyl groups of the curative compounds to the isocyanate groups of the polyisocyanate in excess of the reactive hydrogens of the reactive hydrogen-containing material is from about 0.5/1 to about 1.5/1.

4. The container according to claim 3 where the cured aromatic diisocyanate-modified hydroxyl terminated linear polycarbonate is prepared by reacting the aromatic diamine with the reaction product of an aromatic diisocyanate and a hydroxyl terminated polycarbonate prepared by the reaction of a glycol with the bis chloro formate of the desired glycol.

5. A method of preparing the container of claim 1 which comprises spray coating a polyurethane reaction mixture over the surface of a building form to which the said reaction mixture, when cured, does not tightly adhere, at least partially curing the said reaction mixture, applying a liquid reactive mixture of a curative selected from glycols and aromatic diamines and the reaction product of an aromatic diisocyanate-modified hydroxyl terminated linear polycarbonate, and curing the liquid mixture and first applied reaction mixture to form an adherent laminate and removing the said building form therefrom.

6. The method according to claim 5 where the said liquid coat is prepared by mixing an aromatic diamine with the reaction product of an aromatic diisocyanate and a linear hydroxyl terminated polycarbonate having a molecular weight of from about 800 to about 5000, a hydroxyl number of from about 20 to about 140 and having the general structure:

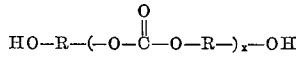

where R is a residue of a saturated acyclic diol and X represents the number of repeating units of the molecule, wherein the ratio of isocyanate groups of the aromatic diisocyanate to the hydroxyl groups of the polycarbonate is from about 1.1/1 to about 12/1 and the ratio of the amine groups of the diamine to the isocyanate groups in excess of the hydroxyl groups of the polycarbonate is from about 0.5/1 to about 1.5/1.

7. The method according to claim 6 where the polyurethane reaction mixture is prepared by mixing at least one curative compound selected from the group consisting of aromatic diamines, hydrocarbon diols, and hydroxylamines, with the reaction product of an organic polyisocyanate and at least one reactive hydrogen-containing compound having a molecular weight of from about 700 and about 5000 and selected from the group consisting of polyester polyols, polyester amides, polyether amides, dihydroxy-terminated polymers of conjugated diene hydrocarbons, and castor oil, wherein the ratio of the isocyanate groups of the polyisocyanate to the reactive hydrogens of the reactive hydrogen-containing compound is from about 1.1/1 to about 12/1 and the ratio of the total amine and hydroxy groups of the curative compounds to the isocyanate groups of the polyisocyanate in excess of the reactive hydrogens of the reactive hydrogen-containing material is from about 0.5/1 to about 1.5/1.

References Cited

UNITED STATES PATENTS

| | | | |
|---|---|---|---|
| 2,999,844 | 9/1961 | Müller et al. | 260—47 X |
| 3,030,335 | 4/1962 | Goldberg | 260—47 X |
| 3,129,014 | 4/1964 | Hutchinson et al. | 161—405 |
| 3,187,065 | 6/1965 | McPherson et al. | 260—47 X |
| 3,214,489 | 10/1965 | Park | 260—47 X |
| 3,251,803 | 5/1966 | Caldwell et al. | 260—47 X |
| 3,325,306 | 6/1967 | Caldwell et al. | 161—190 X |

OTHER REFERENCES

Bodnar, M. J. and Kelly, E. R., "Adhesives Age," vol. 2, No. 4, April 1959, pp. 29–33.

"Lexan—Polycarbonate Resins," Technical Report CDC–392, General Electric Co., Pittsfield, Mass., reissued Nov. 15, 1961, 2 pages.

JOHN T. GOULKASIAN, Primary Examiner

C. B. COSBY, Assistant Examiner

U.S. Cl. X.R.

156—242, 331; 161—405, 190; 260—77.5, 858; 280—5

PO-1050
(5/69)

UNITED STATES PATENT OFFICE
CERTIFICATE OF CORRECTION

Patent No. 3,526,572         Dated September 1, 1970

Inventor(s) Anthony F. Finelli

It is certified that error appears in the above-identified patent and that said Letters Patent are hereby corrected as shown below:

Column 2, line 26, insert --is-- between "form" and "coated".

Column 3, line 10 (first word) should read -- carbonate --.

Column 3, about line 66, the formula which reads:

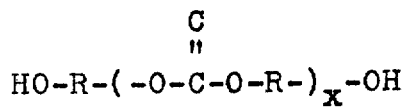

should read:

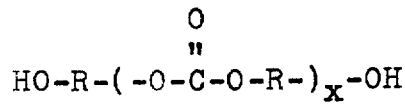

Column 4, line 24, "from" should read "for".

Column 5, line 60, "bonded by a cement" should be deleted (repetitious).

Column 10, line 41, "begin" should read -- being --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents